United States Patent [19]
Gozzo

[11] Patent Number: 5,432,816
[45] Date of Patent: Jul. 11, 1995

[54] SYSTEM AND METHOD OF ROBUST SEQUENCE ESTIMATION IN THE PRESENCE OF CHANNEL MISMATCH CONDITIONS

[75] Inventor: Francesco Gozzo, Ballston Spa, N.Y.

[73] Assignee: International Business Machines Corporation, Armonk, N.Y.

[21] Appl. No.: 866,928

[22] Filed: Apr. 10, 1992

[51] Int. Cl.⁶ .............................................. H03H 7/30
[52] U.S. Cl. .................................. 375/232; 363/131; 375/231; 375/230
[58] Field of Search ...................... 375/13, 14, 99, 101, 375/103, 11, 12; 333/18

[56] References Cited

U.S. PATENT DOCUMENTS

| | | | |
|---|---|---|---|
| 4,539,690 | 9/1985 | Speidel | |
| 4,577,329 | 3/1986 | Brie et al. | |
| 4,974,142 | 11/1990 | Leslie | |
| 4,985,902 | 1/1991 | Gurcan | |
| 5,047,859 | 9/1991 | Koo | 375/13 |
| 5,068,873 | 11/1991 | Murakami | 375/13 |
| 5,111,481 | 5/1992 | Chen | 375/12 |

OTHER PUBLICATIONS

An Adaptive Fir Karman Equalizer With Improved Convergence Properties, M. Yurtseven, M. Kumar, ISA—Paper #90-0983, pp. 507-513 Sep. 1987.
Adaptive Kalman Filter Equaliser, E. Dalle Mese, G. Corsini, Electronics Letters, vol. 16, No. 14, pp. 547-549, Jul. 3, 1980.
Design and Performance of an Adaptive Kalman Receiver for Synchronous Data Transmission, A. Luvison, G. Pirani, IEEE Transactions on Aerospace and Electronic Systems, vol. AES-15, No. 5, pp. 635-648, Sep. 1979.
On Linear Receivers for Digital Transmission Systems, S. Benedetto, E. Biglieri, IEEE Transactions on Communications, vol. COM-22, No. 9, pp. 1205-1215, Sep. 1974.
An Approach to Recursive Equalization via White Sequence Estimation Techniques, S. Prasad, S. Pathak, IEEE Transactions on Communications, vol. COM-35, No. 10, pp. 1037-1040, Oct. 1987.
A State-Variable Approach to the Equalization of Multilevel Digital Signals, A. Luvison, G. Pirani, CSELT Rapporti Tecnici—N. 3—Apr. 1974.
Kalman Filter for Equalization of Digital Communications Channel, S. Kleibanov, V. Prival'skii and I. Time, Consultants Bureau, pp. 1097-1101, Jun. 1974.
A Note on the Modified Kalman Filter for Channel Equalization, J. Mark, Proceedings of the IEEE, pp. 481-482, Apr. 1973.
The Kalman Filter for the Equalization of a Digital Communications Channel, R. Lawrence, H. Kaufman, IEEE Transactions on Communication Technology, vol. COM-19, No. 6, pp. 1137-1140, Dec. 1971.
An Adaptive Kalman Equalizer: Structure and Performance, B. Mulgrew, C. Cowan, IEEE Transactions on Acoustics, Speech and Signal Processing, vol. AS-SP-35, No. 12, pp. 1727-1735, Dec. 1987.

*Primary Examiner*—Stephen Chin
*Assistant Examiner*—William Luther
*Attorney, Agent, or Firm*—Arthur J. Samodovitz; Lynn L. Augspurger

[57] ABSTRACT

An adaptive communications receiver for data-transmission which comprises a channel estimator and sequence estimator. The channel estimator consists of a recursive least squares algorithm which uses a known training signal or past decisions to provide a channel estimate. The sequence estimator consists of a new recursive algorithm which uses the channel estimate to estimate the information sequence transmitted over the channel. The receiver exploits the commonality between the sequence and channel estimator to provide an efficient implementation. The receiver can have varying degrees of non-linearity and is lower in complexity and more robust than linear or decision feedback equalizers in the presence of channel mismatch.

32 Claims, 6 Drawing Sheets

SYSTEM AND METHOD OF ROBUST SEQUENCE ESTIMATION IN THE PRESENCE OF CHANNEL MISMATCH CONDITIONS

FIELD OF THE INVENTION

The present invention relates to receivers which are used in voice and data communications in applications such as multi-media, modem, optical and magnetic storage devices, and wireless systems. In particular, it relates to a system and method of robust sequence estimation in the presence of channel mismatch conditions.

CROSS REFERENCE TO RELATED APPLICATIONS

The present application claims priority from and is related to the following co-pending Patent Application:

U.S. patent application Ser. No. 07/846,651, filed Mar. 5, 1992, entitled "System and Method of Estimating Equalizer Performance in the Presence of Channel Mismatch," of F. Gozzo.

This co-pending application and the present application are owned by one and the same assignee, namely International Business Machines Corporation of Armonk, N.Y. The description set forth in the co-pending application is incorporated into the present application by this reference.

SHORT GLOSSARY OF TERMS

| Term | Definition |
| --- | --- |
| AWGN | Additive White Gaussian Noise |
| BER | Bit Error Rate |
| BLSCE | Batch Least Squares Channel Estimator |
| BLSSE | Batch Least Squares Sequence Estimator |
| Channel | A channel is any physical medium or media for connecting a transmitter and receiver. Functions which are included in transmitter and/or receiver can also be considered part of the channel. Physical media can be air, wire, cable, optical fiber, a magnetic disk, etc. |
| DFE(L,M) | A decision feedback equalizer which has L forward taps and M feedback taps, all of which are assumed to be optimized for an MSE criterion. |
| Equalizer | A form of an ISI receiver for channel communication. |
| KFE | Kalman Filter Equalizer |
| ISI | Intersymbol Interference |
| ISI Receiver | A receiver which attempts to eliminate intersymbol interference. |
| LFE(L,M) | A linear equalizer which has L forward taps and M feedback taps, all of which are assumed to be optimized for an MSE criterion. |
| Mismatch | A receiver which has been optimized for one channel, yet operates under a different channel, is said to operate in the presence of channel mismatch. |
| MSE | Mean square error |
| PAM | Pulse Amplitude Modulation |
| RLS | Recursive Least Squares |
| RLSCE | Recursive Least Squares Channel Estimation |
| RLSSE | Recursive Least Squares Sequence Estimation |
| RLSSE(L,D) | Recursive Least Squares Sequence Estimator with decision depth L and D bits constrained per iteration. It is illustrated by FIG. 6. |
| SNR | Signal to Noise Ratio |

REFERENCES USED IN THE DISCUSSION OF THE INVENTION

In the detailed description which follows, the following works will be referenced as an aid for the reader.

U.S. PATENT DOCUMENTS

U.S. Pat. No. 4,985,902, issued Jan. 2, 1991, of M. K. Gurcan, entitled "Decision Feedback Equalizer and Method of Operating A Decision Feedback Equalizer,"

U.S. Pat. No. 4,539,690, issued Sep. 3, 1985, of J. Speidel entitled "Automatic and Adaptive Digital Nonlinear Decision Feedback Equalizer," and U.S. Pat. No. 4,577,329, issued Mar. 18, 1986, of R. Brie et al., entitled "Self-Adaptive Equalizer For Baseband Data Signals", all are of incidental interest because they relate to a method which attempts to provide sequence estimates based on a Decision Feedback Equalizer. My investigation has shown that the assumptions which underlie those reports are not always valid and that the performance of the present invention can surpass that of the aforementioned patents in many practical situations.

OTHER PATENT DOCUMENTS

UK Pat App 8523286, by Mulgrew and Cowan, September, 1985, entitled "An adaptive infinite impulse response equaliser," is another item of incidental interest and is discussed in the background section.

OTHER PUBLICATIONS

[1] R. E. Lawrence and H. Kaufman, "The Kalman Filter for the Equalization of a Digital Communication Channel," *IEEE Trans. Commun. Tech.*, Vol. COM-19, No. 6, pp 1137–1141, Dec. 1971.

[2] J. W. Mark, "A Note on the Modified Kalman Filter for Channel Equalization," *Proc. of the IEEE*, Vol. 61, pp. 481–482, April 1973.

[3] S. B. Kleibanov, V. B. Privalskii, I. V. Time, "Kalman filter for equalization of digital communications channel," *Automat. and Remote Contr.*, vol. 35, pt. 1, pp. 1097–1102, 1974 (English translation).

[4] A. Luvison and G. Pirani, "A State-Variable Approach to the Equalization of Multilevel Digital Signals," *CSEL T Rapporti Tecnici*, No. 3. pp. 3–22, April 1974.

[5] A. Luvison and G. Pirani, "Design and Performance of an Adaptive Kalman Receiver for Synchronous Data Transmission," *IEEE Trans. Aero. and Elec. Sys.*, Vol. AES-15, No. 5, pp. 635–648, Sept. 1979.

[6] S. Benedetto and E. Biglieri, "On Linear Receivers for Digital Transmission Systems," *IEEE Trans. Commun.*, Vol. COM-22, No. 9, pp. 1205–1214, Sept. 1974.

[7] B. Mulgrew and C. F. N. Cowan, "An Adaptive Kalman Equalizer: Structure and Performance," *IEEE Trans: Acoustics, Speech and Sig. Proc.*, Vol. 35, No. 12, pp. 1727–1735, Dec. 1987.

[8] S. Prasad and S. S. Pathak, "An Approach to Recursive Equalization via White Sequence Estimation Techniques," *IEEE Trans. Commun.*, Vol. COM-35, No. 10, pp. 1037–1040, Oct. 1987.

[9] M. K. Yurtseven and M. M. Kumar, "An Adaptive FIR Kalman Equalizer With Improved Convergence Properties," in *Proc. of Annual Pitts. Conf. on Computer Sim.*, Vol. 21, pt. 2, pp. 507–513, 1990.

[10] E. Delle Mese and G. Corsini, "Adaptive Kalman Filter Equalizer," *Elec. Letters*, Vol. 16, No. 14, pp. 547–549, Jul. 3 1980.

BACKGROUND OF THE INVENTION

It would be of great use to provide a receiver which can be employed in many applications which include, but are not limited to, mobile cellular communications, satellite communications, indoor wireless networks, and multi-media applications (e.g. mass storage devices). Since the physical channel in these systems is susceptible to many variations, the receiver is usually operating with inaccurate channel estimates; thus, the robustness of the receiver is very important in these applications. The kind of receiver which I have created provides a robust sequence estimation capability with low complexity and attractive implementation characteristics. It is called an RLSSE receiver. Before detailing my detailed description, in which I will show that my RLSSE receivers can be implemented in an extremely efficient manner, since the same basic algorithm can be used for both the channel and sequence estimation tasks, I will summarize some past developments.

The Kalman Filter Equalizer (KFE)

The basic RLSSE structure is related to the Kalman filter equalizer (KFE) originally proposed by Lawrence and Kaufman [1], who utilized a discrete Kalman filter in order to estimate a binary input sequence transmitted over a dispersive FIR channel. They also treated the channel estimation problem by extending the state vector to include the channel tap coefficients. This (nonlinear) extended Kalman-filter (EKF) approach falls into the category of blind equalization since no training sequence is exploited.

There have been several other efforts which follow the KFE approach for sequence estimation. Mark [2] briefly discusses the initialization of the state vector as well as a method of avoiding the EKF approach in [1] by estimating the channel tap gains via a pseudo-decision feedback approach. Kleibanov et al. [3] also investigated the same Kalman equalizer but further investigated its convergence properties and Showed the advantages of increasing the filter dimension beyond the length of the channel filter. Luvison and Pirani [4] [5] also proposed a scheme which is based on that of Lawrence and Kaufman [1] but additionally discussed topics such as carrier recovery, timing extraction, and limitations of the KFE under real-time constraints.

An in-depth summary of the KFE as well as its practical considerations can be found in the work of Benedetto and Biglieri [6]. They extend the theory to cover correlated data and also provide several examples to demonstrate the sensitivity of the KFE to channel mismatch. Mulgrew and Cowan also present a detailed state-space analysis of the KFE for signalling over minimum and non-minimum phase channels [7] (see also UK Pat App 8523286, Sept 1985). By exploiting Wiener filter theory, [7] bounds the performance of the Kalman Filter Equalizer (KFE) and shows that the convergence and MSE performance of finite impulse response transversal filters and KFEs are roughly the same. They also found that the KFE was typically of lower order, although this does not necessarily constitute lower overall complexity.

Prasad and Pathak [8] develop a similar analysis in that a state-space approach is exploited. However, they use a smoothing approach from seismology and claim that it yields marginally better performance than the Kalman filter [1] under a low-complexity constraint. More recently, Yurtseven and Kumar [9] revisited the work of Kalman [1] and applied a stochastic Newton algorithm for the estimation of the extended state-vector. Although they claim to have improved on the EKF approach [1], their approach is also not guaranteed to converge. Similar efforts for improving the EKF channel estimator were also found in the work of Delle Mese and Corsini [10].

Limitations of the KFE Receiver

Although the KFE schemes described above are theoretically sound and may be useful in certain applications, they share two fundamental limitations. First, one must have an accurate estimate of the noise statistics represented as $n_k$ 40 in FIG. 1 in order to fully exploit the Kalman filter structure. This not only increases system complexity (since a noise variance estimator must be implemented), but it also renders KFE receivers susceptible to noise mismatch. Second, and more importantly, is the fact that the Kalman filter is inherently a linear filter, hence its performance over channels with spectral nulls will be severely degraded by noise-enhancement. In fact, the performance of all KFE receivers is (asymptotically) no better than conventional linear equalizers optimized for an MSE criterion. This fundamental limitation, coupled with the noise mismatch problem, precludes the use of existing KFE schemes over many practical channels.

Motivation Behind The RLSSE Receiver

The RLSSE receiver proposed herein has been motivated by three practical needs: Low-complexity, reduced sensitivity to channel mismatch, and adequate performance over channels with spectral nulls. My receiver differs from the KFE schemes in several fundamental respects. First, the error criterion used in the RLSSE scheme is based on a least squares criterion rather than a least mean square criterion. Since the least squares approach makes no assumptions regarding the statistics of the noise 40, I found that the RLSSE algorithms are impervious to white gaussian noise mismatch and that they are significantly less complex because an estimate of the noise variance is not needed.

Another fundamental difference is that one class of the proposed RLSSE algorithms is nonlinear. Therefore, while my simplest (linear) algorithm is comparable in performance to linear equalizers, and hence KFE receivers, my constrained RLSSE algorithm can cope with channels with spectral nulls. Finally, and perhaps most importantly from a practical standpoint, I will show that my algorithms lead to an extremely efficient implementation since the channel estimation and sequence estimation tasks have a duality that is fully exploited by the RLSSE approach.

SUMMARY OF THE INVENTION

In order to provide the quality needed for evaluation of a received signal and reduce the cost of the evaluation, I provide a common way to evaluate two kinds of elements affecting the received signal. The information sequence needs evaluation and the channel filter effect needs evaluation. In accordance with my invention I provide a receiver which evaluates a received signal. At an input port for a received signal which has the characteristics that need evaluation (including two signal sequences, one of which is an unknown information sequence and another of which is an unknown channel filter effect), the signal is carried to my receiver system. The receiver system provides an output estimate of the unknown information sequence, and a common functional evaluation unit for evaluating the received signal performing the functions of a sequence estimator and a means for providing a channel estimate. By using common functional steps a common functional unit can be provided, and embodied in a single chip.

In this invention I apply the theory of recursive least squares (RLS) algorithms to the problem of sequence estimation over intersymbol interference (ISI) channels. Specifically, I will propose a new family of low-complexity ISI receivers which are based on variants of the common RLS algorithm. These new algorithms, which I will refer to collectively as recursive least squares sequence estimation (RLSSE) algorithms, offer the performance and low complexity enjoyed by linear and DFE receivers, yet are insensitive to practical phenomena such as noise mismatch which was shown to plague both linear and DFE receivers in one patent application Ser. No. 07/846,651 of Mar. 5, 1992.

In accordance with the present invention a system and method is provided which provides a robust sequence estimation capability with low complexity and attractive implementation characteristics.

The receiver of the present invention is comprised of a channel estimator, which estimates the coefficients of the discrete-time equivalent channel filter (also known as a channel impulse response), and a sequence estimator which provides an estimate of the information sequence which was transmitted over the discrete-time equivalent channel.

The algorithms used by the channel estimator and sequence estimator of the present invention have been successfully implemented on a variety of computers including simple desktop and large mainframe systems. Based on the performance on these systems, implementing the present invention in real-time applications via common general-purpose processors is highly desirable.

My invention is important in many applications including the fields of mobile cellular communications, satellite communications, indoor wireless networks, and multi-media applications (e.g. mass storage devices).

BRIEF DESCRIPTION OF THE DRAWINGS

My detailed description explains the preferred embodiments of my invention, together with advantages and features, by way of example with reference to the following drawings.

FIG. 8 shows the magnitude spectrum of a particular discrete-time equivalent channel filter 20 as a function of the parameter a.

Figure 1:
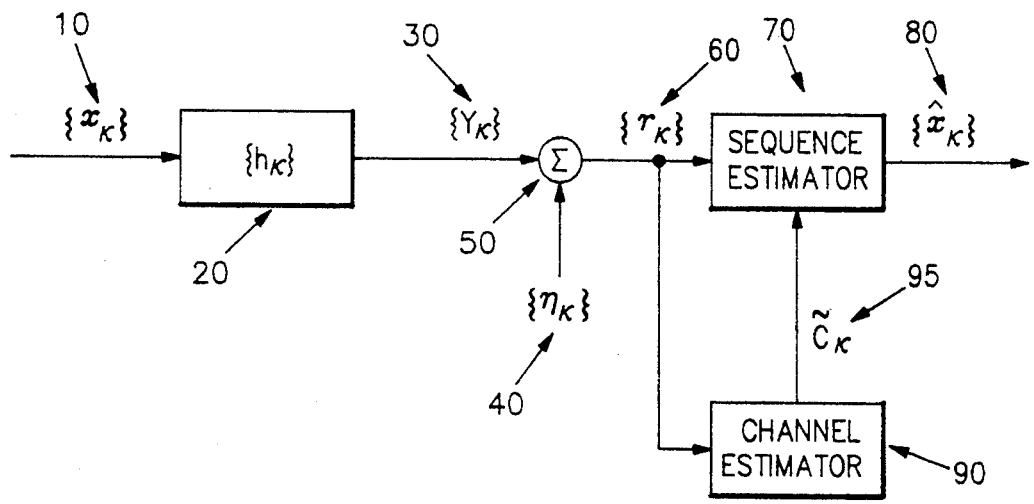
FIG. 1 shows schematically an overview of the popular discrete-time equivalent communication system model assumed by the present invention, and shows the receiver system which is comprised of a channel estimator and a sequence estimator.

Tables 1–5 illustrate my invention. They are detailed at the end of the detailed description for convenient reference.

DETAILED DESCRIPTION OF THE INVENTION

Before considering my preferred embodiments in detail, it is worthwhile to briefly review the theoretical development and discuss a simple test example.

First, I provide a review of the channel estimation problem where I introduce notation and emphasize those points which are key to the RLSSE algorithms. The structure of the linear RLSSE algorithm is then developed, followed by an extension to the more generic nonlinear RLSSE receiver. Finally, I provide a theoretical analysis of the linear receiver, followed by a detailed empirical performance analysis of both linear and nonlinear versions. Implementation considerations are then briefly discussed, followed by a summary and concluding remarks.

Review of Least Squares Channel Estimation

Although the development of the least squares channel estimator 90 is now well known, I briefly review it here so that my RLSSE development can exploit this familiar derivation. I will derive both the batch and recursive forms of the least squares channel estimator 90 in order to expose the features which will help one to predict the performance of the RLSSE receiver. In addition, in order to deal with possible variations in the coefficients of the channel filter 20, an exponential weighting will also be employed in the least squares performance index.

Batch Least Squares Channel Estimator (BLSCE)

For generality, I assume the dynamics of the discrete-time equivalent channel filter 20 can be described by a finite-order difference equation given by $$y_k = \sum_{i=1}^{M} a_i y_{k-i} + \sum_{i=0}^{L-1} b_i x_{k-i} \qquad (1)$$

Though hereinafter x will be assumed to be binary to simplify the discussion and mathematical manipulation, equation 1 holds true for any m-ary (for example binary, ternary, quaternary, etc.).

where $x_k$ and $y_k$ represent the noise-free channel filter input 10 and output 20, respectively, and M and L represent the order of the model. Thus, it is clear that $y_k$ 30 can be recursively computed based solely on M past outputs and L inputs, and my development also holds for the special FIR case (i.e., M=0).

I can define the coefficients of the actual channel filter in (1) by a and b, which are of dimension $M \times 1$ and $L \times 1$, respectively, and are given by $$a = [a_1 \, a_2 \ldots a_M]^T$$
$$b = [b_0 \, b_1 \ldots b_{L-1}]^T \qquad (2)$$

where $[\bullet]^T$ denotes transposition. For notational simplicity, an $(M+L) \times 1$ coefficient vector is introduced and defined as $$c = \begin{bmatrix} a \\ b \end{bmatrix} \qquad (3)$$

The number of parameters in equation 3 can be doubled for complex channels so that the imaginary portion can be represented.

Since the vector c completely specifies the actual channel filter 20, the channel estimation function can be posed as finding an estimate, $\tilde{c}$, which is closest to c in a least squares sense.[1] The actual channel filter 20 and its estimate at time k will be denoted by $c_k$ and $\tilde{c}_k$ 95, respectively.

[1] Real-valued (soft) estimates of a vector z will be denoted as $\tilde{z}$. In the sequence estimator 70 development, z will denote a binary (hard) estimate. Also, unless denoted otherwise by context, lowercase bold symbols represent vectors, while uppercase bold symbols represent matrices.

Assume that a known training sequence of N+1 symbols is transmitted, resulting in N+1 input-output observable pairs, $$\{(x_0, r_0) (x_1, r_1) \ldots (x_N, r_N)\} \qquad (4)$$

In order to ensure a unique solution, let N > n where n is defined as n = max(L,M). Let the vector $q_k$ be defined as the $(M+L) \times 1$ training vector 330[2]

[2] For IIR channels (M>0), the first M elements in $q_k$ are not observable, even with known training signals. An estimate of $q_k$, such as $q_k = [r_{k-1} \, r_{k-2} \ldots r_{k-M} \, x_k \, x_{k-1} \ldots x_{k-(L-1)}]^T$ must be used during implementation. Although the implications of this are not significant at moderate SNR, this will, in general, lead to biased channel estimates for IIR adaptive filters based on an output-error formulation. Thus, my preferred embodiment utilizes an FIR channel filter model.

$$q_k = [y_{k-1} \, y_{k-2} \ldots y_{k-M} \, x_k \, x_{k-1} \ldots x_{k-(L-1)}]^T \qquad (5)$$

Note that the values used for the training signal can be past decisions from the sequence estimator 70.

I define the estimation error, $e_k$, as the difference between the actual channel output (i.e., the desired response) and the estimated channel output, $$e_k = r_k - q_k^T \tilde{c}_k \qquad (6)$$

I can use the vector form of the above equation, i.e.

$$e_N = r_N - Q_N \tilde{c}_N \qquad (7)$$

where $r_N$ 230 and $e_N$ are $(N-n+1) \times 1$ observable and error vectors, respectively, and $Q_N$ is an $(N-n+1) \times (M+L)$ training matrix. These are given by $$r_N = [r_n \, r_{n+1} \ldots r_N]^T$$
$$e_N = [e_n \, e_{n+1} \ldots e_N]^T \qquad (8)$$

$$Q_N = \begin{bmatrix} q_n^T \\ q_{n+1}^T \\ \vdots \\ q_N^T \end{bmatrix}$$

The cost, J, for a weighted least squares performance index can be expressed as $$J = \sum_{k=n}^{N} w_k e_k^2 \qquad (9)$$

where $w_k$ will be defined as an exponential weighting term, $$w_k = \gamma^{(N-k)}; \; 0 < \gamma \leq 1, \; n \leq k \leq N \qquad (10)$$

In order to express my cost equation in matrix form, I can define a weighting matrix, $W_N$, whose elements are given by $$W_N(i,j) = \begin{cases} w_{n+i-1}; & i = j \\ 0; & i \neq j \end{cases} \qquad (11)$$

Thus, my cost function can be formulated as:

$$\begin{aligned} J &= e_N^T W_N e_N \\ &= [r_N - Q_N \tilde{c}_N]^T W_N [r_N - Q_N \tilde{c}_N] \\ &= r_N^T W_N r_N - 2 \tilde{c}_N^T Q_N^T W_N r_N + \tilde{c}_N^T Q_N^T W_N Q_N \tilde{c}_N \end{aligned} \qquad (12)$$

Now, by using the gradient operator to minimize (12) with respect to $\tilde{c}_N$, I get $$\nabla J = -2 Q_N^T W_N r_N + 2 Q_N^T W_N Q_N \tilde{c}_N = 0 \qquad (13)$$

where 0 is the all-zero vector. Solving for $\tilde{c}_N$ yields the optimal weighted least squares channel estimate.

---Optimal Weighted Least Squares Estimator---

$$\tilde{c}_N^{LS} = [Q_N^T W_N Q_N]^{-1} Q_N^T W_N r_N \qquad (14)$$

By inspecting (14), one sees that by continuously updating the observable vector r 230 and the training matrix Q, I can update my channel estimate accordingly. This can be accomplished by updating $r_k$ 230 as follows $$r_k^T = r_{k-1}^T S + r_k g \qquad (15)$$

where I have introduced an initialization vector, g 200, which is defined by $$g = [0\ 0\ \ldots\ 0\ 0\ 1] \quad (16)$$

and the shift matrix, S 210, given by $$S = \begin{bmatrix} 0 & 0 & & & 0 & 0 \\ 1 & 0 & & & 0 & 0 \\ 0 & 1 & & & . & . \\ . & . & \ldots & & . & . \\ . & . & & & . & . \\ . & . & & & 0 & 0 \\ 0 & 0 & & & 1 & 0 \end{bmatrix} \quad (17)$$

Figure 2:
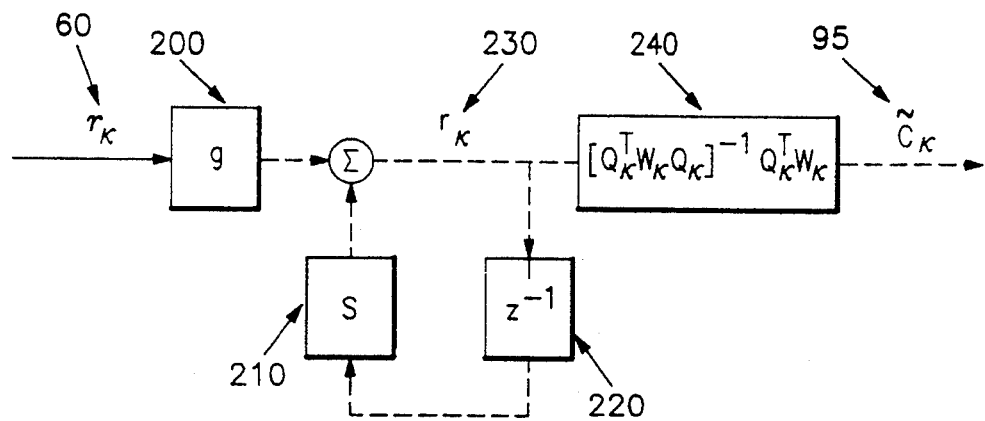
FIG. 2 shows the channel estimator 90 of FIG. 1 in more detail, and specifically shows a particular channel estimator I will refer to as the batch least squares channel estimator (BLSCE) which provides an estimate of the channel filter 20.

A block diagram[3] of the BLSCE structure is shown in FIG. 2. Note that while the continuous update of the observable vector, r 230, is explicitly shown, the continuous update of the training matrix, Q, is not shown. Several observations can now be made regarding the BLSCE structure which will be useful for comparing with the batch sequence estimator 70 development:

[3] Solid lines in diagrams represent scalar values, while dashed lines represent vector quantities.

BLSCE Observations

1. Linear Estimator—Since all operations on the observable vector 230 are linear operations, I see that the BLSCE structure is clearly a linear estimator.
2. Time-Varying—Since $q_k^T$, and hence $Q_k^T$, are changing with each new training symbol, the filter shown in the diagram is a time-varying structure. Note further that this is true whether the channel is time-variant or not.
3. High Complexity—Since the BLSCE filter is guaranteed to be time-variant, the inverse operation shown in the diagram must be performed with each new sample. This is, of course, highly inefficient and so recursive forms are desirable.

Recursive Least Squares Channel Estimator (RLSCE)

Figure 3:
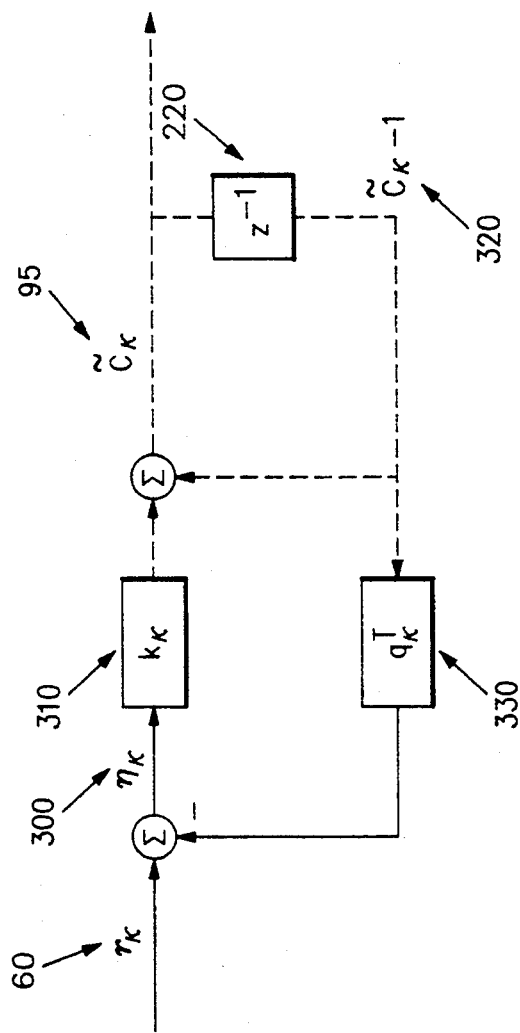
FIG. 3 shows a more efficient version of the BLSCE device shown in FIG. 2. This particular channel estimator is my recursive least squares channel estimator (RLSCE) which is the preferred embodiment for the channel estimator of the present invention.

The recursive implementation of (14) is embodied in FIG. 3. The figure illustrates a linear recursive estimator which forces the estimate to take the form $$\tilde{c}_k = \tilde{c}_{k-1} + k_k \eta_k \quad (18)$$

where $\eta_k$ represents the estimation error, and $k_k$ 310 is a gain vector. Thus, the heart of the recursive solution lies in finding the gain vector which yields the least squares estimate.

A summary of the key equations in the RLSCE algorithm are given in TABLE 1. This common algorithm can be modified to use variants of the recursive least squares algorithm including fast RLS, lattice implementation and square root or Cholesky factorization method. Note that the algorithm requires an initialization of $\tilde{c}_k$ 95 by an initial guess, as well as a starting point for the correlation matrix inverse $P_k^{-1} = Q_k^T W_k Q_k$ to remedy its possibly ill-conditioned nature. Also, the intermediate variables, $U_k$ and $v_k$, have been introduced to reduce computations.

Least Squares Sequence Estimation

Before I develop the RLSSE algorithm, it is worthwhile to step back and contrast the channel and sequence estimation problems. The motivation behind the RLSSE receiver is more apparent once one sees the strong duality which exists between these two problems.

Duality Between Channel and Sequence Estimation

Theoretically, the receiver has no knowledge of whether a signal $\{x_k\}$ was passed through a linear filter with impulse response $\{h_k\}$, or, whether $\{h_k\}$ was passed through a filter with impulse response $\{x_k\}$. The channel output is simply the noise-corrupted convolution of the channel input 10 and channel filter 20, $$r_k = x_k * h_k + n_k \quad (19)$$

By posing both problems in a system identification framework, I can describe the two problems as dual adaptive filtering tasks. That is, the channel estimation process uses a known information sequence to identify an unknown channel while the sequence estimation process uses a "known" channel filter 20 to identify an unknown sequence.

The inherent similarity between channel and sequence estimation is clearly evident from (19). Several observations worth noting are:

1. Both problems are inverse problems (more specifically, deconvolution problems) which are known to be ill-posed.
2. In general, accurate knowledge of $\{h_k\}$ 20 is required to estimate $\{x_k\}$ 10, and vice-versa.
3. Accurate estimation of an arbitrary $\{h_k\}$ 20 requires the use of a known sequence $\{x_k\}$ 10 which is persistently exciting, and vice-versa.

Although both problems share these similarities, the fact remains that $\{h_k\}$ 20 is specified over a field of real numbers, and $\{x_k\}$ 10 is over a binary field. Thus, while channel estimation deals with the estimation of a finite number of real valued parameters, sequence estimation deals with the estimation of an infinite number of binary valued parameters.

Batch Least Squares Sequence Estimator (BLSSE)

The duality described above suggests that by making several modifications, the same estimator structure can be used. I now revisit the batch channel estimator 90 and perform the appropriate modifications.

First, an appropriate model for the unknown information sequence must be found. Since it is assumed that $\{x_k\}$ 10 is an uncoded sequence[4], the z-transform of an arbitrary L-length message sequence can be given by a simple FIR model

[4] This model could be easily modified for sequences which are coded by a known linear filter.

$$X(z) = \sum_{i=0}^{L-1} x_i z^{-i} \quad (20)$$

Thus, by using the same naming convention followed in the channel estimation development, I find that the coefficient vector and its soft estimate are now given by $$c_k = [x_{k-(L-1)}\ x_{k-(L-1)+1} \ldots x_{k-1}\ x_k]^T$$

$$\tilde{c}_k = [\tilde{x}_{k-(L-1)}\ \tilde{x}_{k-(L-1)+1} \ldots \tilde{x}_{k-1}\ \tilde{x}_k]^T \quad (21)$$

Next, I must reexamine the topic of input-output observable pairs. Recall that the channel estimator 90 development required the use of a known training sequence. The same applies for sequence estimation.

However, now the "known" training signal is the estimate of the channel filter 20. Thus, the training vector 330 is now given by the (L×1) vector $$q_k = [\tilde{h}_{L-1} \tilde{h}_{L-2} \ldots \tilde{h}_1 \tilde{h}_0]^T \qquad (22)$$

where the estimated samples of the channel filter 20 are determined by $$\tilde{h}_k = \sum_{i=1}^{M} \tilde{a}_i h_{k-i} + \sum_{i=0}^{L-1} \tilde{b}_i \delta_{k-i} \qquad (23)$$

where $\delta_{k-1}$ is the Dirac delta function, and the parameters $\tilde{a}_i$ and $\tilde{b}_i$ were found by the channel estimator 90. Note that the training matrix also changes with the new $q_k$ as defined in (8).

A summary of these key variables and their counterparts in the channel estimation process are shown in TABLE 2.

By exploiting the duality shown above and substituting directly in (14).

$$\tilde{c}_k = [Q_k^T W_k Q_k]^{-1} Q_k^T W_k r_k \qquad (14)$$

I obtain the unconstrained least squares solution, i.e., the real-valued parameter vector which is closest to the actual parameter vector in a least squares sense. Recall, however, that I am interested in an infinite-length binary-valued sequence. In order to accomplish this, I first extract the first element of $\tilde{c}_k$ 95 by filtering the parameter vector to obtain $$\tilde{x}_{k-(L-1)} = f \tilde{c}_k \qquad (24)$$

where the pick-off vector, $f$ 400, is defined by $$f = [1 \; 0 \ldots 0] \qquad (25)$$

This soft-decision can now be passed through a simple threshold device 420 to yield the hard-decision, $\hat{x}_{k-(L-1)}$ 80, i.e.

$$\hat{x}_{k-(L-1)} = sgn\{\tilde{x}_{k-(L-1)}\} = \begin{cases} +1; \tilde{x}_{k-(L-1)} \geq 0 \\ -1; \tilde{x}_{k-(L-1)} < 0 \end{cases} \qquad (26)$$

Figure 4:
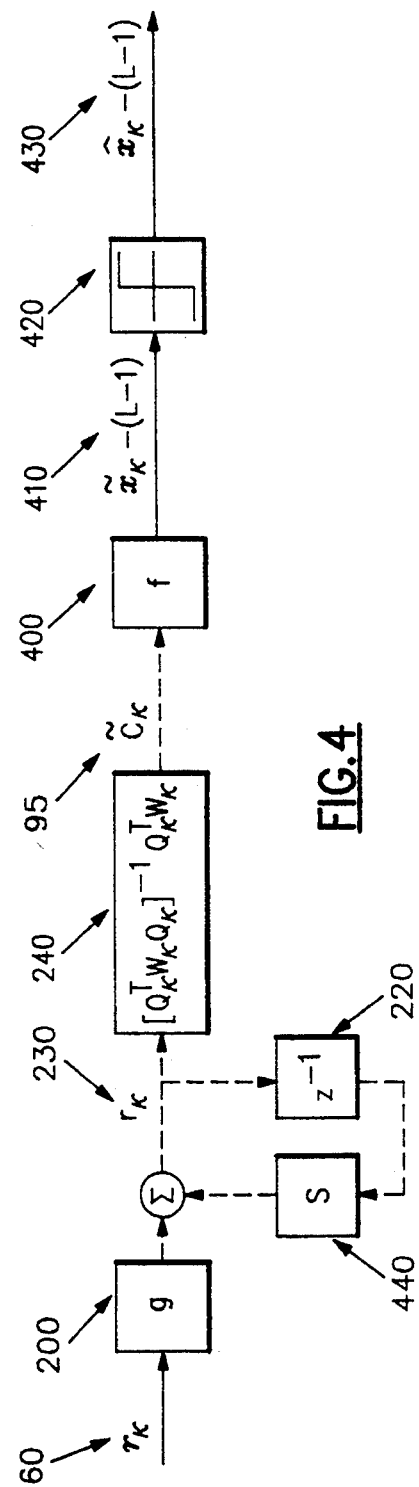
FIG. 4 shows the sequence estimator 70 of FIG. 1 in more detail and specifically shows a particular sequence estimator I will refer to as the batch least squares sequence estimator (BLSSE).

The process described would continue by simply shifting the elements of $r_k$ as was done in the BLSCE structure and recomputing the least squares solution given by (14). A block diagram of the BLSSE receiver is shown in FIG. 4.

BLSSE Observations

1. Identical in Structure To Batch Channel Estimator—Up to the pick-off vector, f 400, shown in FIG. 4, the BLSSE and BLSCE structures are identical in form; hence, by simply redefining the contents of the training vector 330, one can use the same architecture to estimate both the channel and unknown sequence.
2. Linear Estimator—As was the case for the BLSCE structure, the soft estimate is a linear function of the observable vector 230; hence, the BLSSE estimator, up to the threshold device 420, is a linear receiver.
3. Time-Invariant Receiver For Time-Invariant Channels—Recall that the batch channel estimator 90 was time-varying, even for stationary channel filters. If the channel filter varies with time, then the BLSSE receiver will also be time-varying. However, if the channel filter is time-invariant, the training vector $q_k^T$ 330, and hence $Q_k^T$, of the BLSSE receiver will not change with each new training symbol. Therefore, once an initial burst of symbols has been sent, the sequence estimator reaches steady-state and hence becomes stationary.
4. Moderate Complexity—Since the sequence estimator 70 is time-invariant for time-invariant channel filters 20, the matrix $[Q_k^T W_k Q_k]^{-1} Q_k^T W_k$ must be calculated just once; hence, the batch form itself is not as inefficient as the BLSCE structure. However, even though the BLSSE structure may be more efficient than its BLSCE counterpart under time-invariant conditions, the ability to handle time-varying channel filters 20 still necessitates a recursive form.

Recursive Least Squares Sequence Estimator (RLSSE)

The recursive form of the least squares sequence estimator 70 follows the exact derivation of the recursive channel estimator 90. The only difference is at the end of each iteration where the following must occur in order to accommodate the shift and threshold 420 operations:

1. Pick Off and Constrain Soft Estimate—Prior to shifting the elements of the coefficient vector, I must first extract an estimate of the "oldest" symbol, i.e., $\tilde{x}_{k-(L-1)}$. Analytically, I can do so by filtering the parameter vector by the pick-off vector f 400 defined in (25). Once this soft estimate has been removed from the coefficient vector, I constrain it and announce the final estimate.
2. Shift and Initialize $\tilde{c}_k$—By noting the form of the parameter vector, it is clear that after each iteration, a new initial estimate of the parameter vector can be found by simply shifting the elements to the left by using the shifting matrix, S 210, already defined in (17). In addition, while all RLS algorithms require an initial estimate of the coefficient vector at start-up, my RLSSE scheme requires a continuous initialization of the current (rightmost) symbol of the coefficient vector. This can be trivially accomplished by augmenting the shifted coefficient vector by the quantity $\tilde{x}_k g$, where $\tilde{x}_k$ is an initial guess of the current symbol. Note that for my equally-likely binary model, $\tilde{x}_k = 0$, but I leave this important step in the algorithm for generality and for possible extensions to coded schemes.

Note that the shift matrix is a linear operation which is useful for the purpose of analysis, but in practice this is a trivial memory shift which simply propagates a particular vector element from right to left. Thus, for a filter of length five, the unconstrained parameter vector and its shifted/initialized version could be generally described by $$\tilde{c}_k^T = [\tilde{c}_1 \; \tilde{c}_2 \; \tilde{c}_3 \; \tilde{c}_4 \; \tilde{c}_5]$$

$$\tilde{c}_k^T S + \tilde{x}_k g = [\tilde{c}_2 \; \tilde{c}_3 \; \tilde{c}_4 \; \tilde{c}_5 \; \tilde{x}_k] \qquad (27)$$

3. Shift and Initialize $P_k$—The inverse covariance matrix must also be shifted (up and to the left) to remain synchronized with the coefficient vector. This can be accomplished by filtering the covariance matrix by the transformation $S^T P S$ where S 210 is the previously defined shifting matrix. It should be noted that this covariance shift effectively shifts the elements of $k_k$ 310 as well.

The "new" elements of $P_k$ which correspond to the new symbol must also be initialized with each incoming symbol. I can satisfy this initialization by augmenting the shifted covariance matrix above with the matrix $\epsilon^{-1}gI$ whose entries are all zero except for the lower-right element which has the value $\epsilon^{-1}$. For example, shifting and initializing an arbitrary 3×3 matrix, P, would appear as $$P = \begin{bmatrix} P(1,1) & P(2,1) & P(3,1) \\ P(1,2) & P(2,2) & P(3,2) \\ P(1,3) & P(2,3) & P(3,3) \end{bmatrix} \quad (28)$$

$$S^{T}PS + \epsilon^{-1}gI = \begin{bmatrix} P(2,2) & P(3,2) & 0 \\ P(2,3) & P(3,3) & 0 \\ 0 & 0 & \epsilon^{-1} \end{bmatrix}$$

Figure 5:
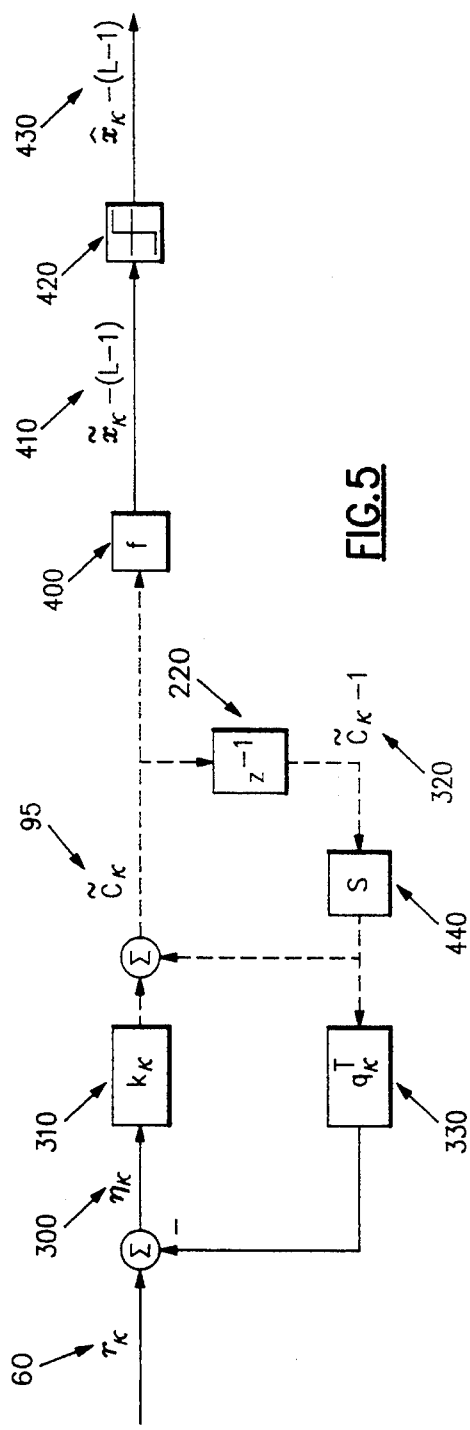
FIG. 5 shows a more efficient version of the linear BLSSE device shown in FIG. 4. This recursive sequence estimator will be referred to as the linear recursive least squares sequence estimator and denoted as RLSSE(L,0).

A block diagram of the linear RLSSE receiver is shown in FIG. 5. For reasons which will be apparent in the next section, this receiver will be referred to as the RLSSE(L,0) receiver.

Constraining the Estimator—The RLSSE(L,D) Algorithm

The DFE is undoubtedly the most popular nonlinear receiver which exhibits both low complexity and reasonable performance over channels with spectral nulls. Furthermore, since the DFE is merely a nonlinear variant of the linear feedback equalizer, I have created a nonlinear variant of the linear RLSSE estimator in an effort to improve its performance over several practical channels with severe ISI.

Toward that end, consider the role of the past sequence estimate, $\bar{c}_{k-1}$ 320, shown in FIG. 5. During each iteration, this vector acts as an initial guess which will be corrected based on the error 300 and gain vector 310. Note, however, that $\bar{c}_{k-1}$ 320 represents a soft estimate of the true coefficient vector $c_k$; hence, I already know that it is, in general, not correct. Thus, it seems intuitive to constrain these soft estimates before they are used in the next iteration. If these decisions are correct, then $\bar{c}_k$ 95 stands a good chance of being correct as well. However, since some of these elements have been in the RLSSE decoding window for only a few samples and are furthermore noise-corrupted, an incorrect decision certainly is possible. The leftmost element of $\bar{c}_{k-1}$ 320, however, can be considered the most mature estimate, i.e., it has propagated through the full length of the RLSSE window and so it seems reasonable to assume that, after some point, it has been equalized to some extent such that constraining it may improve the overall performance.

Figure 6:
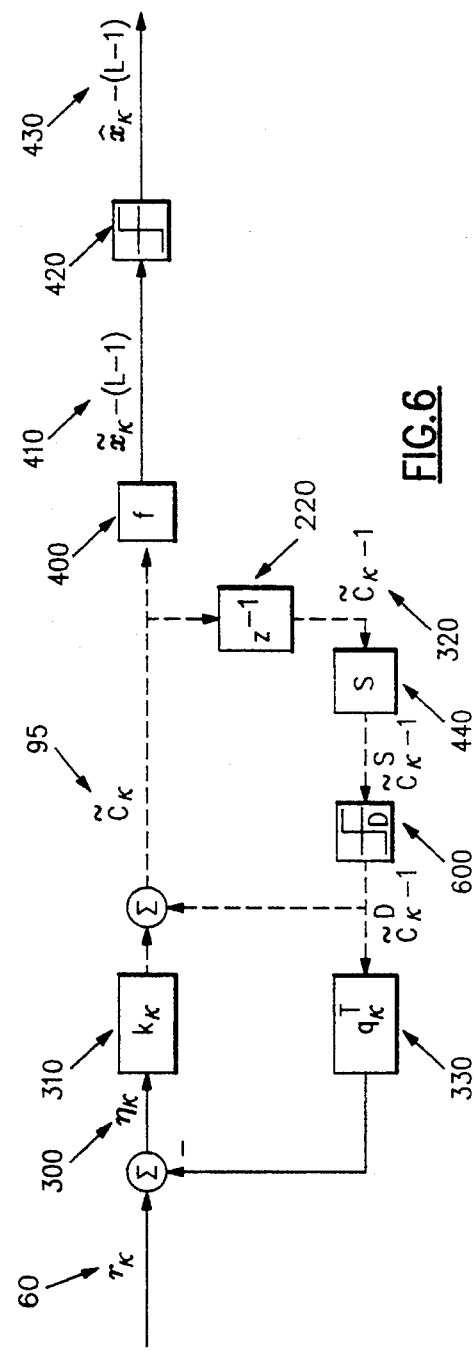
FIG. 6 shows the preferred embodiment for the sequence estimator of the present invention. This sequence estimator includes the linear receiver of FIG. 5 but also extends it to the nonlinear case. I will refer to this receiver as RLSSE(L,D).

In this spirit, I extend the linear RLSSE receiver to a new nonlinear structure which I call the RLSSE(L,D) receiver, as Shown in FIG. 6.

Figure 7:
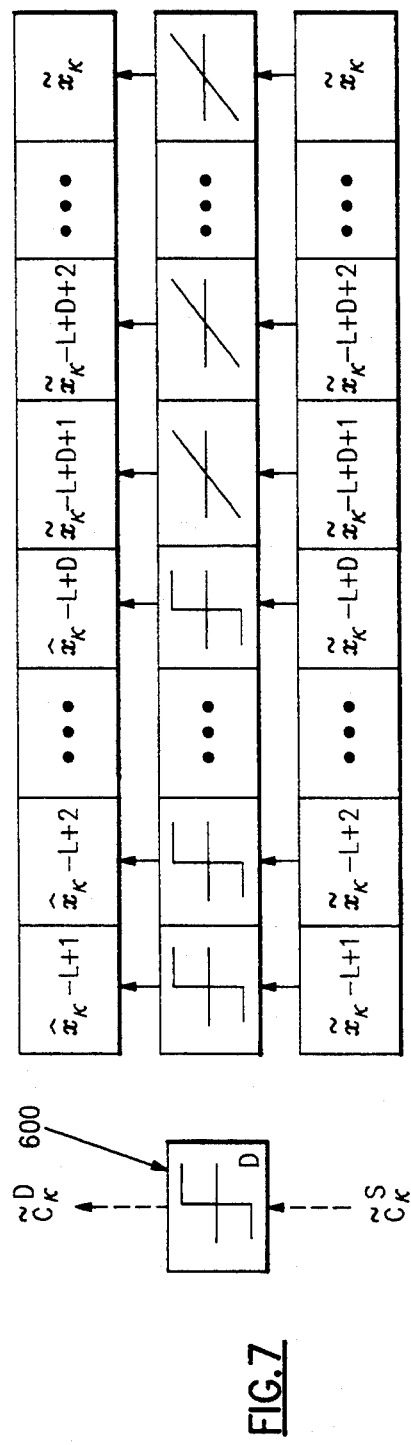
FIG. 7 shows an expanded functional view of the D-threshold device 600 shown in FIG. 6.

In the figure, all elements are identical to those found in FIG. 5 except the new D-threshold device 600 which has been inserted in the feedback path. The 'D' which is in the lower-right corner of the device signifies that only the leftmost D symbols will be constrained. Thus, the RLSSE(L,0) is the linear receiver already discussed, while, at the other extreme, the RLSSE(L,L) receiver uses a fully-constrained estimate. An expanded view of the D-threshold device 600 is shown in FIG. 7 and a summary of the steps in the RLSSE(L,D) algorithm is given in TABLE 3.

Observations on RLSSE(L,D) Receiver

1. Varying Degrees of Nonlinearity—By noting once again that the final soft estimate is linear in the observable vector 230, note that for D=0, the RLSSE is a linear estimator up to the threshold device 420. However, one can also increase D up to the length of the RLSSE window to increase the degree of nonlinearity.

2. Same Core Algorithm As RLSCE—It is important to note that the processing required by STEPS 0-8 of the RLSSE algorithm are identical to those found in the RLSCE algorithm, but the definition of $q_k$ has changed. Furthermore, STEPS 0-8 represent virtually all of the significant processing. This significant fact suggests that an RLSSE-based receiver can exploit the same core architecture for both the channel and sequence estimation tasks as I have successfully accomplished during extensive tests.

3. Low to Moderate Complexity—As shown in TABLE 3, the RLSSE algorithm can handle time-varying channels since $q_k$ need only be updated with the new channel estimate. From the complexity analysis shown in TABLE 3, I see that the worst-case complexity is $O(N^2)$ for time-varying channels. If, however, the channel is time-invariant, the gain vector rapidly converges to its steady-state value. Therefore, the burdensome task of computing $P_k$ is not necessary, and so STEPS 2-7 and STEP 12 can be avoided, resulting in an $O(N)$ algorithm.

4. Synchronous Operation—After the initial burst of L symbols have been received, the algorithm will synchronously generate estimates. Thus, the overhead of buffer management required by some receivers is avoided.

Theoretical Performance Analysis

An informative theoretical analysis of the nonlinear RLSSE(L,D) receiver does not seem feasible without unrealistic assumptions; hence, computer simulations have been used to establish the performance of the generic RLSSE(L,D) receiver. However, by assuming stationary and ergodic conditions, the theoretical performance of the linear RLSSE(L,0) structure can be easily determined, as is shown below.

Perfect Channel Knowledge

If one assumes that the channel estimator 90 generated a perfect estimate of the channel filter 20, the mean square error (MSE) performance of the linear RLSSE(L,0) structure can be readily ascertained. Since the least squares and least mean square error are asymptotically identical in AWGN, the asymptotic performance of the RLSSE(L,0) structure with perfect channel knowledge is that of all linear receivers which were optimized for an MSE criterion which is —MSE of $RLSSE(\infty,0)$ Receiver in White Gaussian Noise $$J_{RLSSE(\infty,0)} = \frac{1}{2\pi} \int_{-\pi}^{\pi} \frac{N_0}{|H(e^{j\omega})|^2 + N_0} d\omega \quad (29)$$

where $|H(e^{j\omega})|^2$ represents the discrete power spectrum of the channel filter 20 and $N_0$ is the variance of the noise 40.

White Gaussian Noise Mismatch

If the variance of the noise 40 during training differs from that during decoding, a noise mismatch condition is present. However, recall that the RLSSE approach does not depend on the noise statistics, either implicitly or explicitly. It is strictly based on the channel estimate. Therefore, as long as the training sequence is sufficiently long such that the channel estimate converges to an unbiased solution, the performance of the RLSSE(L,D) algorithm during decoding is independent of the noise variance during training. Hence, the RLSSE(L,D) receiver is insensitive to white gaussian noise mismatch, and the MSE performance given in (29) is valid for the special case of noise mismatch. This insensitivity to noise mismatch is a significant advantage which is not offered by linear or decision feedback equalizers, as was shown in U.S. Ser. No. 07/846,651.

Arbitrary Channel Mismatch

I can apply the same argument to the case of arbitrary channel mismatch as long as I constrain the noise 40 to be white and gaussian. Therefore, by using the arbitrary channel mismatch paradigm derived in U.S. Ser. No. 07/846,651 and by constraining the noise 40 to be white, I find the asymptotic performance of the RLSSE(L,0) receiver is given by MSE of RLSSE($\infty$,0) in Channel Mismatch and White Gaussian Noise $$J_{RLSSE(\infty,0)} = \frac{1}{2\pi} \int_{-\pi}^{\pi} \frac{N_0}{|H(e^{j\omega})|^2 + N_0} + \frac{|[|H(e^{j\omega})|^2 + N_0]H_T(e^{j\omega}) - [|H_T(e^{j\omega})|^2 + N_0]H(e^{j\omega})|^2}{[|H_T(e^{j\omega})|^2 + N_0]^2[|H(e^{j\omega})|^2 + N_0]} d\omega \quad (30)$$

where $H_T(e^{j\omega})$ and $H(e^{j\omega})$ are the spectrum of the channel filter 20 during training and decoding, respectively. Now, by exploiting the arbitrary mismatch result from the related patent U.S. Ser. No. 07/846,651, I can directly compare the performance of the RLSSE(L,0) receiver to linear and decision feedback equalizers in the presence of channel mismatch in white gaussian noise. This comparison is shown in TABLE 4 for the case of white gaussian noise mismatch and TABLE 5 for the general case of arbitrary channel filter mismatch in white gaussian noise.

By comparing the theoretical performance of the RLSSE and LFE receivers, it is clear that they are identical in ideal conditions and that the RLSSE is superior for the case of white gaussian mismatch. This is also true under most practical arbitrary channel mismatch cases. The test results which follow will corroborate this important conclusion.

Test Results

My theoretical predictions and simulation results for the test channel 20 are shown in FIG. 8 through FIG. 12. Note that test results for other well known channels led to similar conclusions.

Figure 8:
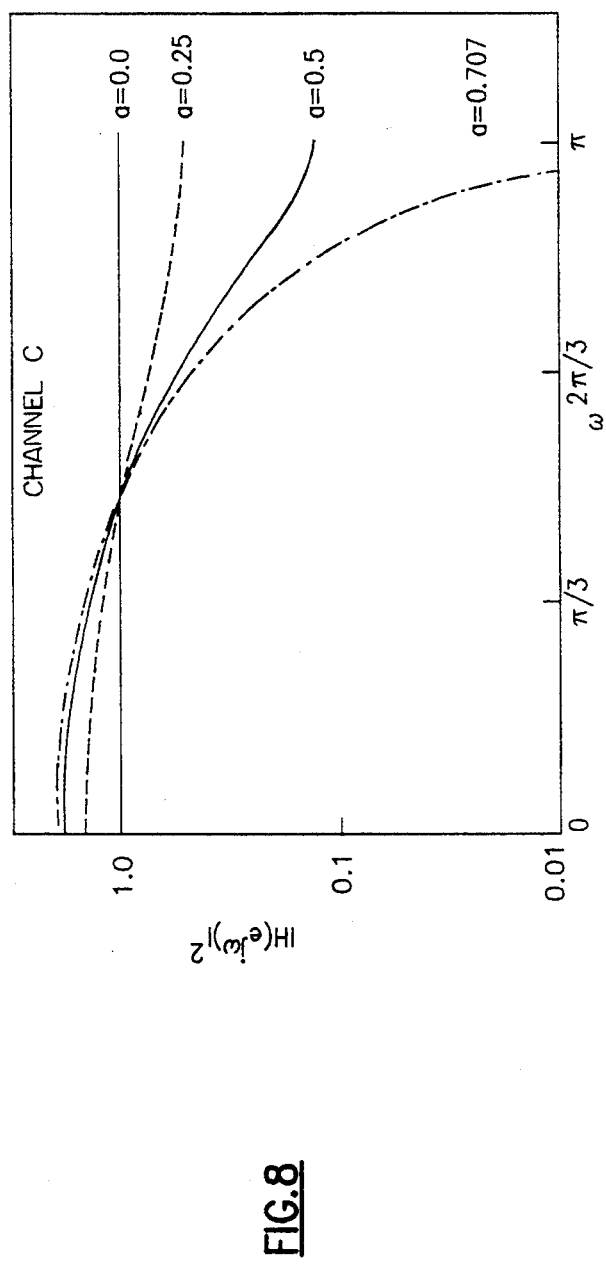

FIG. 8 shows the magnitude spectrum of a typical test channel used in my tests.

Figure 9:
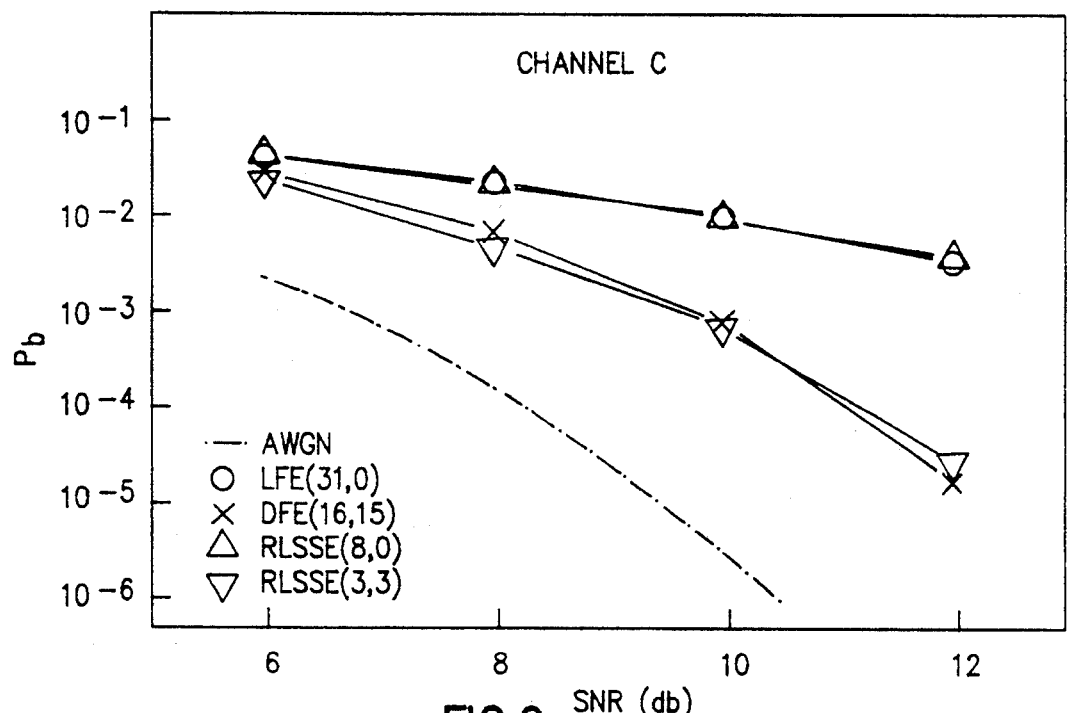
FIG. 9 compares the performance of the present invention against linear and DFE receivers over the test channel shown in FIG. 3 when there is no channel mismatch.

FIG. 9 shows the performance of the RLSSE receiver over the test channel shown in FIG. 8, when no mismatch is present, i.e. ideal conditions. As a comparison, experimental data for the LFE and DFE receivers are also shown.

Figure 10:
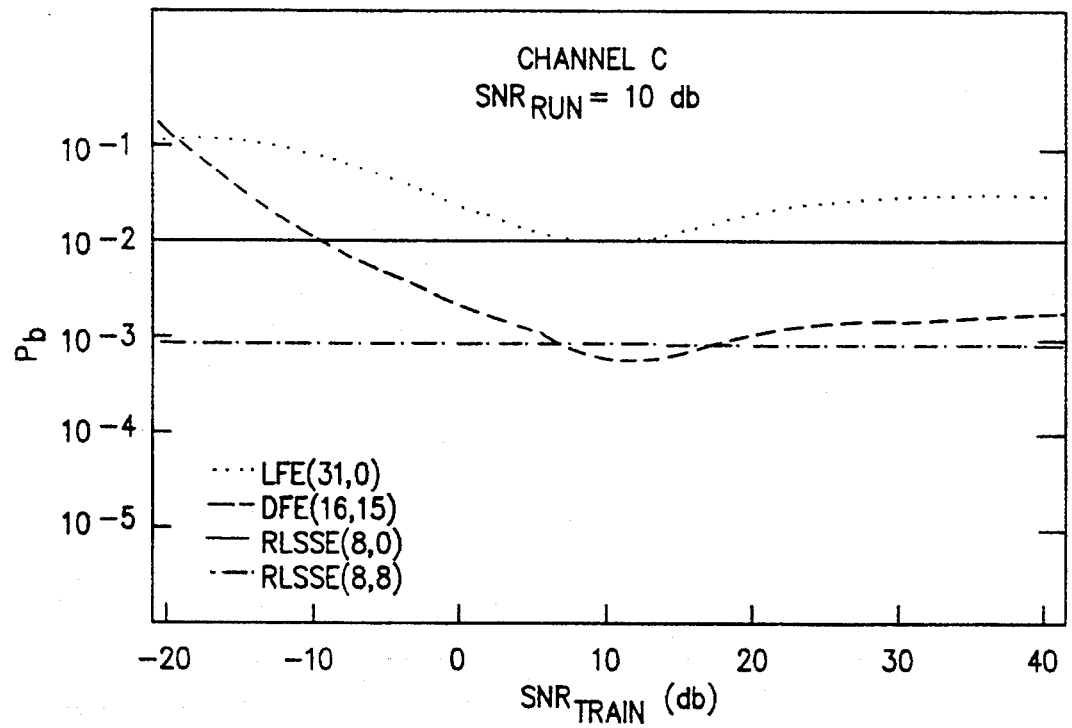
FIG. 10 compares the performance of the present invention against linear and DFE receivers over the test channel shown in FIG. 3 when there is white gaussian noise mismatch present.

FIG. 10 shows the performance of the RLSSE receiver over the test channel shown in FIG. 8 when white gaussian noise mismatch is present. As a comparison, experimental data for the LFE and DFE receivers are also shown.

Figure 11:
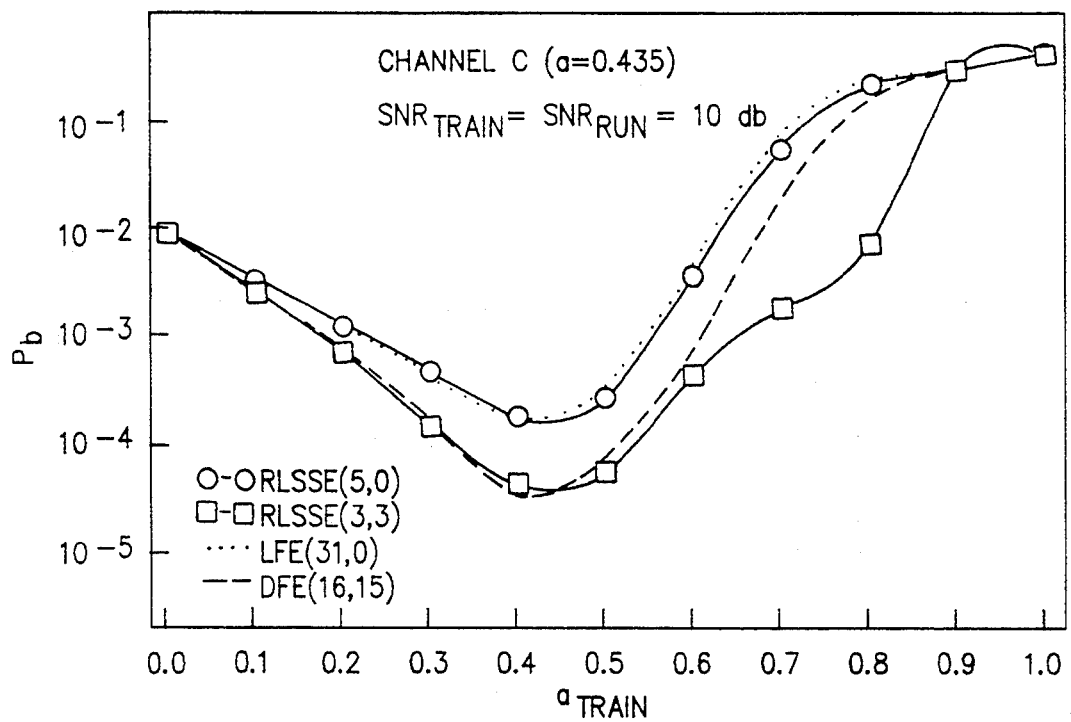
FIG. 11 compares the performance of the present invention against linear and DFE receivers over the test channel shown in FIG. 3 when there is channel filter mismatch present.

FIG. 11 shows the performance of the RLSSE receiver over the test channel shown in FIG. 8 when channel filter mismatch is present. As a comparison, experimental data for the LFE and DFE receivers are also shown.

Figure 12:
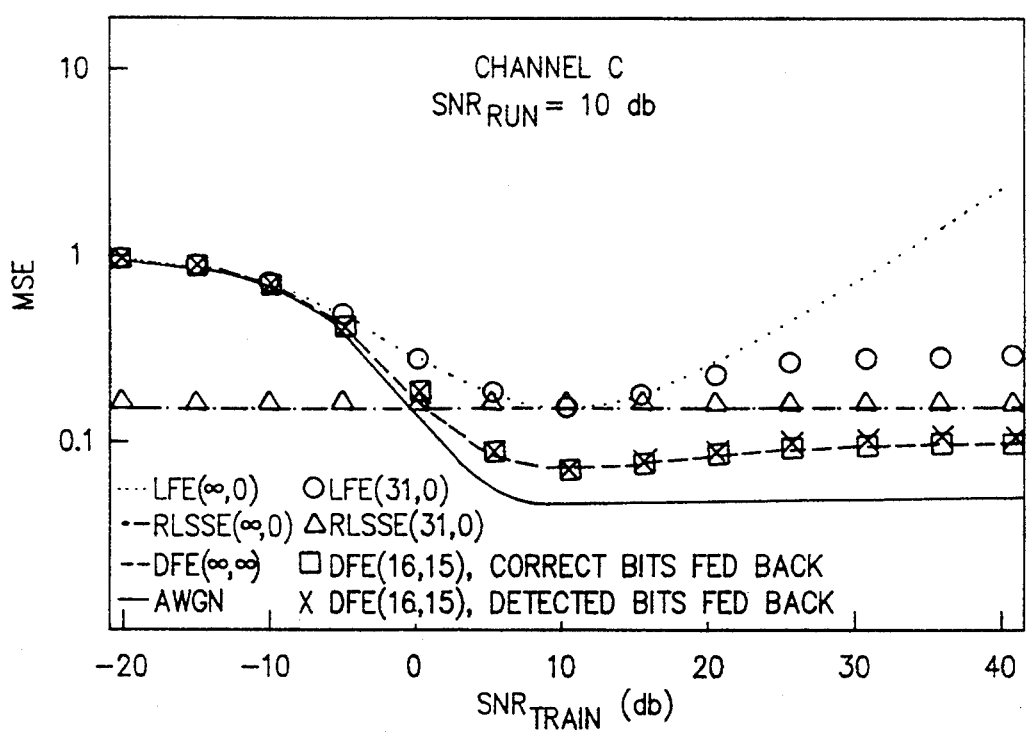
FIG. 12 compares the theoretical versus test performance of the present invention in the presence of white gaussian noise mismatch. The theoretical and experimental results for LFE and DFE receivers is also shown.

FIG. 12 shows the accuracy of my theoretical predictions for the test channel shown in FIG. 3 when the noise variance is mismatched. Note that the same conclusions drawn from the BER curves of FIG. 10 are made for MSE curves of FIG. 12.

Test Conclusions and Practical Implications

There are several general observations which can be made from my described theoretical and test results. The present invention when implemented provides for robust sequence estimation in the presence of channel mismatch. The theoretical and experimental data clearly show the superiority of the present invention over standard linear and DFE receivers in mismatched conditions.

1. RLSSE(L,O) outperforms conventional linear equalizer. Theoretical and test results show the performance of the RLSSE(L,O) is comparable to that of standard linear equalizers under no mismatch (ideal) conditions. When noise mismatch is present, the RLSSE(L,O) performance far exceeded that of LFE receivers as well as the DFE receiver in some severe cases of mismatch.

2. RLSSE(L,O) is extremely robust. While linear and DFE receivers required tedious optimization of the training delay, no such delay was necessary or used for the linear RLSSE(L,0) receiver. Thus, its robustness with respect to channel mismatch and the algorithm parameters (L, $\epsilon$, and $\gamma$) were extremely good.

3. RLSSE(L,D) is roughly equivalent to DFE over some practical channels. For several channels with minimal precursors, the fully-constrained RLSSE(L,L) receiver was comparable to a DFE in performance under ideal conditions and substantially better in the presence of noise mismatch over those channels. The optimization of D can also be carried out for other channels, where further improvements may also be attained by incorporating a delay in the channel estimation process and/or incorporating prefilters to mitigate precursors.

4. RLSSE receiver can be implemented in an extremely efficient manner. The same core algorithm was used for both the channel estimation and sequence estimation functions. Incorporating both channel estimator 90 and sequence estimator 70 on a single chip is possible with RLSSE, which is highly advantageous for applications such as hand-held communications, multi-media, wireless networks, and other size/weight-/cost constrained systems.

System Implementation of the Preferred Embodiment

The embodiment of the present invention can be described in greater detail with reference to TABLE 1 and TABLE 3 which illustrate the recursive least squares channel estimator (RLSCE) and the recursive least squares sequence estimator (RLSSE) algorithm. It will be appreciated that this code can be implemented in software, firmware, and hardware in implementing the sequence estimator 70 and channel estimator 90. Before describing each step, note that the functions +, −, *, and / represent a means of addition, subtraction, multiplication, and division, respectively.

Channel Estimator

The algorithm of TABLE 1 is first used to estimate the channel filter 20. The preferred embodiment would use a known training sequence to estimate the channel response although alternative embodiments will be claimed as well.

STEP 0 of TABLE 1 performs an initialization of the channel estimate vector and the inverse covariance matrix.

STEP 1 of TABLE 1 provides the actual reception of the signal, $r_k$ 60.

STEP 2 of TABLE 1 provides the generation of the training vector, $q_k$ 330.

STEP 3 of TABLE 1 provides the generation of an intermediate variable, $U_k$, which is the product of the inverse covariance matrix, $P_k$, and the inverse of the exponential weighting parameter, $\gamma$. This step is introduced to reduce the overall complexity, but it is not required if $\gamma = 1$.

STEP 4 of TABLE 1 provides the generation of an intermediate variable, $v_k$, which is the product of the intermediate variable $U_k$ with the training vector $q_k$ 330.

STEP 5 of TABLE 1 provides the calculation of the gain vector which is a function of the intermediate variable $v_k$ and the training vector $q_k$ 330.

STEP 6 of TABLE 1 provides the calculation of the innovation term, $\eta_k$ 300.

STEP 7 of TABLE 1 provides the calculation of the inverse of the correlation matrix as a function of the intermediate variables $U_k$, $v_k$, and the gain vector $k_k$ 310.

STEP 8 of TABLE 1 provides the calculation of the channel estimate $\tilde{c}_k$ 95 as a function of the past channel estimate, $\tilde{c}_{k-1}$ 320, the gain vector $k_k$ 310 and the innovation term, $\eta_k$ 300.

The preferred embodiment for the channel estimator would repeat STEPS 1–8 of TABLE 1 for each bit in the known training sequence. This training sequence would be inserted in the information sequence on a periodic schedule whose period is determined by the rate of change of the channel filter coefficients.

Sequence Estimator

Having found a channel estimate via the known training signal, the receiver now switches to a decoding mode, i.e., the (unknown) data is transmitted and the recursive least squares sequence estimate (RLSSE) algorithm of TABLE 3 is used to estimate that data.

STEP 0 of TABLE 3 performs an initialization of the sequence estimate vector and the inverse covariance matrix.

STEP 1 of TABLE 3 provides the actual reception of the signal, $r_k$ 60.

STEP 2 of TABLE 3 provides the generation of the training vector, $q_k$ 330. Note the only difference between this and STEP 2 of TABLE 1 illustrates the contents of the data vector, which now contains the channel estimate coefficient found from STEP 8 of TABLE 1.

STEP 3 of TABLE 3 provides the generation of an intermediate variable, $U_k$, which is the product of the inverse covariance matrix, $P_k$, and the inverse of the exponential weighting parameter, $\gamma$. This step is introduced to reduce the overall complexity, but it is not required if $\gamma = 1$.

STEP 4 of TABLE 3 provides the generation of an intermediate variable, $v_k$, which is the product of the intermediate variable $U_k$ with the training vector $q_k$ 330.

STEP 5 of TABLE 3 provides the calculation of the gain vector which is a function of the intermediate variable $v_k$ and the training vector $q_k$ 330.

STEP 6 of TABLE 3 provides the calculation of the innovation term.

STEP 7 of TABLE 3 provides the calculation of the inverse of the correlation matrix as a function of the intermediate variables $U_k$, $v_k$, and the gain vector $k_k$ 310.

STEP 8 of TABLE 3 provides the calculation of the sequence estimate $\tilde{c}_k$ 95 as a function of the past sequence estimate, $\tilde{c}_{k-1}$ 320, the gain vector $k_k$ 310 and the innovation term, $\eta_k$ 300. Note that the only difference between $\tilde{c}_k$ of TABLE 1 and TABLE 3 is its content which now now provides the soft sequence estimates.

STEP 9 of TABLE 3 provides picking off the oldest estimate and constraining to announce a decision.

STEP 10 of TABLE 3 provides shifting the sequence estimate and providing an initial guess for the newest received bit.

STEP 11 of TABLE 3 constrains the oldest D bits in the sequence estimate vector.

STEP 12 of TABLE 3 shifts and initializes the inverse covariance matrix $P_k$.

The RLSSE receiver would process STEP 1–12 of TABLE 3 for each new received bit and would process STEP 1–8 of TABLE 1 as necessary to maintain accurate channel estimates.

It is important to note that STEPS 1–8 of TABLE 1 and STEPS 1–8 of TABLE 3 are identical and furthermore account for the majority of all processing. Therefore, the preferred embodiment implements one core algorithm (STEPS 1–8) which can be invoked by either the channel estimator 90 or the sequence estimator 70.

In addition, since the gain vector $k_k$ 310 will reach steady-state for time-invariant channels, STEPS 2–7 and STEP 12 of TABLE 3 are not necessary after an initial block of information. Thus, the preferred embodiment would ignore these steps once the gain vector converges. Note further that this convergence has been found to occur very quickly, so that practical applications with time-varying, or slowly-time varying channels (e.g., modem, multi-media, and some wireless channels) can be processed with low complexity.

The following Tables amplify the description of my invention:

TABLE 1

Recursive Least Squares Channel Estimator (RLSCE) Algorithm

| # | Procedure | ± | × | ÷ | ≷ | I/O | Storage | Comment |
|---|---|---|---|---|---|---|---|---|
| 0 | $k = 0, \tilde{c}_0 = c_{init}, P_0 = \epsilon^{-1}I$ | — | — | — | — | — | — | Initialization |
| 1 | $r_k, k = k + 1$ | 0 | 0 | 0 | 0 | 1 | 1 | Receive Signal |
| 2 | $q_k$ | 0 | 0 | 0 | 0 | N | N | Training Vector |
| 3 | $U_k = \gamma^{-1}P_{k-1}$ | 0 | $0.5(N^2 + N)$ | 0 | 0 | $0.5(N^2 + N)$ | $N^2$ | Intermediate Step |
| 4 | $v_k = U_k q_k$ | $N^2$ | $N^2$ | 0 | 0 | 1 | N | Intermediate Step |
| 5 | $k_k = \dfrac{v_k}{1 + q_k^T v_k}$ | N + 1 | N | N | 0 | 1 | N | Gain Vector |
| 6 | $\eta_k = r_k - q_k^T \tilde{c}_{k-1}$ | N + 1 | N | 0 | 0 | 1 | 1 | Innovation Term |
| 7 | $P_k = U_k - k_k v_k^T$ | $0.5(N^2 + N)$ | $0.5(N^2 + N)$ | 0 | 0 | $0.5(N^2 + N)$ | $N^2$ | Correlation Matrix Inverse |
| 8 | $\tilde{c}_k = \tilde{c}_{k-1} + k_k \eta_k$ | N | N | 0 | 0 | 0 | N | Channel Estimate |
|   | Total | $1.5N^2 + 3.5N + 2$ | $2N^2 + 4N$ | N | 0 | $N^2 + 2N + 4$ | $2N^2 + 4N + 2$ | |

Notes:
1. $\tilde{c}_k = [\tilde{a}_1 \ldots \tilde{a}_M \tilde{b}_0 \ldots \tilde{b}_{L-1}]^T$, $q_k = [y_{k-1} \ldots y_{k-M} x_k \ldots x_{k-(L-1)}]^T$
2. N used in table is the order of the estimator, i.e., $N \triangleq M + L$
3. $c_{init}$ is initial estimate; $\epsilon$ is small positive constant; $\gamma$ is exponential-weighting.
4. I/O represents memory input/output with no arithmetic operations performed.
5. Step 3 not required if $\gamma = 1.0$

TABLE 2

Duality Between Channel and Sequence Estimation

|  | Channel Estimation | Sequence Estimation |
|---|---|---|
| Signal Model | $H(z) = \sum_{i=0}^{L-1} h_i z^{-i}$ | $X(z) = \sum_{i=0}^{L-1} x_i z^{-i}$ |
| Coefficient Vector, $c_k$ | $[h_{L-1}\, h_{L-2} \ldots h_1\, h_0]^T$ | $[x_{k-(L-1)}\, x_{k-(L-1)+1} \ldots x_k]^T$ |
| Training Vector, $q_k$ | $x_k\, x_{k-1} \ldots x_{k-(L-1)}]^T$ | $[\tilde{h}_{L-1}\, \tilde{h}_{L-2} \ldots \tilde{h}_1\, \tilde{h}_0]^T$ |

Note:
An FIR channel model is shown since this is the preferred embodiment for the channel estimator function of the receiver. The duality also exists for IIR channel models, and so it can also be exploited by the RLSSE approach.

TABLE 3

The RLSSE(L,D) Algorithm

| # | Procedure | ± | × | ÷ | ≷ | I/O | Storage | Comment |
|---|---|---|---|---|---|---|---|---|
| 0 | $k = 0, \tilde{c}_0 = c_{init}, P_0 = \epsilon^{-1}I$ | — | — | — | — | — | — | Initialization |
| 1 | $r_k, K = k + 1$ | 0 | 0 | 0 | 0 | 1 | 1 | Receive Signal |
| 2 | $q_k$ | 0 | 0 | 0 | 0 | L | L | Training Vector |
| 3 | $U_k = \gamma^{-1}P_{k-1}$ | 0 | $0.5(L^2 + L)$ | 0 | 0 | $0.5(L^2 + L)$ | $L^2$ | Intermediate Step |
| 4 | $v_k = U_k q_k$ | $L^2$ | $L^2$ | 0 | 0 | 1 | L | Intermediate Step |
| 5 | $k_k = \dfrac{v_k}{1 + q_k^T v_k}$ | L + 1 | L | L | 0 | 1 | L | Gain Vector |
| 6 | $\eta_k = r_k - q_k^T \tilde{c}_{k-1}$ | L + 1 | L | 0 | 0 | 1 | 1 | Innovation Term |
| 7 | $P_k = U_k - k_k v_k^T$ | $0.5(L^2 + L)$ | $0.5(L^2 + L)$ | 0 | 0 | $0.5(L^2 + L)$ | $L^2$ | Correlation Matrix Inverse |
| 8 | $\tilde{c}_k = \tilde{c}_{k-1}^D + k_k \eta_k$ | L | L | 0 | 0 | 0 | L | Sequence Estimate |
| 9 | $\tilde{x}_{k-(L-1)} = \text{sgn}(f\tilde{c}_k)$ | 0 | 0 | 0 | 1 | 0 | 0 | Pickoff & Constrain |
| 10 | $\tilde{c}_{k-1}^S = \tilde{c}_{k-1}^T S + \tilde{x}_k g$ | 0 | 0 | 0 | 0 | L | 0 | Shift & Initialize $\tilde{c}_k$ |
| 11 | $\tilde{c}_{k-1}^D = \text{sgn}_D(\tilde{c}_{k-1}^S)$ | 0 | 0 | 0 | D | 0 | 0 | Constrain D Symbols |
| 12 | $P_k = S^T P_k S + \epsilon^{-1} gI$ | 0 | 0 | 0 | 0 | $L^2$ | 0 | Shift & Initialize $P_k$ |
|   | Total | $1.5L^2 + 3.5L + 2$ | $2L^2 + 4L$ | L | D + 1 | $2L^2 + 3L + 4$ | $2L^2 + 4L + 2$ | |

Notes:
1. $\tilde{c}_k = [\tilde{x}_{k-(L-1)}\, \tilde{x}_{k-(L-1)+1} \ldots \tilde{x}_{k-1}\, \tilde{x}_k]^T$, $q_k = [\tilde{h}_{L-1}\, \tilde{h}_{L-2} \ldots \tilde{h}_1\, \tilde{h}_0]^T$
2. $C_{init}$ is initial estimate; $\epsilon$ is small positive constant; $\gamma$ is exponential-weighting; $\tilde{x}_k$ is soft estimate of current symbol.
3. Steps 1-8 are identical to the RLSCE algorithm of TABLE 1.
4. Step 3 not required if $\gamma = 1.0$
5. For time-invariant channels, Steps 2-7 and Step 12 are not necessary after the gain vector converges.

TABLE 4

Theoretical MSE Performance of RLSSE, LFE, and DFE in White Gaussian Noise Mismatch.

| Receiver | Mean Square Error |
|---|---|
| RLSSE(∞, 0) | $\dfrac{1}{2\pi} \displaystyle\int_{-\pi}^{\pi} \dfrac{N_0}{|H(e^{j\omega})|^2 + N_0} d\omega$ |

TABLE 4-continued

Theoretical MSE Performance of RLSSE, LFE, and DFE in White Gaussian Noise Mismatch.

| Receiver | Mean Square Error |
|---|---|
| LFE($\infty$, 0) | $\frac{1}{2\pi} \int_{-\pi}^{\pi} \frac{N_0}{\|H(e^{j\omega})\|^2 + N_0} + \frac{\Delta^2 \|H(e^{j\omega})\|^2}{[\|H(e^{j\omega})\|^2 + N_0 + \Delta]^2 [\|H(e^{j\omega})\|^2 + N_0]} d\omega$ |
| DFE($\infty$, $\infty$) | $\exp\left\{ \frac{1}{2\pi} \int_{-\pi}^{\pi} \ln\left[ \frac{N_0}{\|H(e^{j\omega})\|^2 + N_0} + \frac{\Delta^2 \|H(e^{j\omega})\|^2}{[\|H(e^{j\omega})\|^2 + N_0 + \Delta]^2 [\|H(e^{j\omega})\|^2 + N_0]} \right] d\omega \right\}$ |

Assumptions:
1. Source is uncorrelated sequence with unit power.
2. Noise is AWGN with variance $N_0 + \Delta$ during training and $N_0$ during decoding.
3. MSE for DFE($\infty$, $\infty$) receiver assumes correct past decisions.

TABLE 5

Theoretical MSE Performance of RLSSE, LFE, and DFE in Channel Filter and White Gaussian Noise Mismatch.

| Receiver | Mean Square Error |
|---|---|
| RLSSE($\infty$, 0) | $\frac{1}{2\pi} \int_{-\pi}^{\pi} \frac{N_0}{\|H(e^{j\omega})\|^2 + N_0} + \frac{\|[\|H(e^{j\omega})\|^2 + N_0]H_T(e^{j\omega}) - [\|H_T(e^{j\omega})\|^2 + N_0]H(e^{j\omega})\|^2}{[\|H_T(e^{j\omega})\|^2 + N_0]^2 [\|H(e^{j\omega})\|^2 + N_0]} d\omega$ |
| LFE($\infty$, 0) | $\frac{1}{2\pi} \int_{-\pi}^{\pi} \frac{N_0}{\|H(e^{j\omega})\|^2 + N_0} + \frac{\|[\|H(e^{j\omega})\|^2 + N_0]H_T(e^{j\omega}) - [\|H_T(e^{j\omega})\|^2 + N_0 + \Delta]H(e^{j\omega})\|^2}{[\|H_T(e^{j\omega})\|^2 + N_0 + \Delta]^2 [\|H(e^{j\omega})\|^2 + N_0]} d\omega$ |
| DFE($\infty$, $\infty$) | $\exp\left\{ \frac{1}{2\pi} \int_{-\pi}^{\pi} \ln\left[ \frac{N_0}{\|H(e^{j\omega})\|^2 + N_0} + \frac{\|[\|H(e^{j\omega})\|^2 + N_0]H_T(e^{j\omega}) - [\|H_T(e^{j\omega})\|^2 + N_0 + \Delta]H(e^{j\omega})\|^2}{[\|H_T(e^{j\omega})\|^2 + N_0 + \Delta]^2 [\|H(e^{j\omega})\|^2 + N_0]} \right] d\omega \right\}$ |

Assumptions:
1. Source is uncorrelated sequence with unit power.
2. Noise is AWGN with variance $N_0 + \Delta$ during training and $N_0$ during decoding. Channel filter spectrum is $H_T(e^{j\omega})$ and $H(e^{j\omega})$ during training and decoding, respectively.
3. MSE for DFE($\infty$, $\infty$) receiver assumes correct past decisions.

While I have described my preferred embodiments of my invention, it will be understood that those skilled in the ad, both now and in the future, may make make various improvements and enhancements which fall within the scope of the claims which follow. These claims should be construed to maintain the proper protection for the invention first disclosed.

What is claimed is:

1. A receiving system for use with an adaptive receiver for providing an output signal $\hat{x}_{k-(L-1)}$ 80 in response to an input signal $r_k$ 60 received from a discrete-time equivalent channel which has a linear channel filter 20 having channel filter coefficients being coupled to a transmitted information sequence $x_k$ and additive white gaussian noise 40, said receiving system comprising:

a sequence estimator and a means for providing a channel estimate;

said sequence estimator 70 having as inputs a received signal $r_k$ and a channel filter estimate 95 from a channel estimator 90 whose L coefficients are determined by said means for providing a channel estimate, and as output the hard decision $\hat{x}_{k-(L-1)}$ 80 which is an estimate of the transmitted information sequence $x_k$ 10 according to the recursive relation:

$$U_k = \gamma^{-1} P_{k-1}$$

$$v_k = U_k q_k$$

$$k_k = \frac{v_k}{1 + q_k^T v_k}$$

$$\eta_k = r_k - q_k^T \tilde{c}_{k-1}$$

$$P_k = U_k - k_k v_k^T$$

$$\tilde{c}_k = \tilde{c}_{k-1}{}^D + k_k \eta_k$$

$$\hat{x}_{k-(L-1)} = sgn(f\tilde{c}_k)$$

$$\tilde{c}_{k-1}{}^S = \tilde{c}_{k-1}{}^T S + \tilde{x}_k g$$

$$\tilde{c}_{k-1}{}^D = sgn_D(\tilde{c}_{k-1}{}^S)$$

$$P_k = S^T P_k S + \epsilon^{-1} gI$$

where $\gamma$ is the desired exponential weighting parameter for the sequence estimator, $P_{k-1}$ is an L by L inverse correlation matrix initialized to $\epsilon^{-1} I$, I is the L by L identity matrix, $\epsilon$ is the desired initialization parameter for the sequence estimator, sgn(z) denotes a binary threshold device which returns a one (1) if its parameter z is greater than or equal to zero and minus one $(-1)$ if z is less than zero, $\tilde{c}_k$ is the soft-estimate vector of the transmitted information sequence $x_k$ through $x_{k-(L-1)}$ initialized to an arbitrary vector, $sgn_D(z)$ denotes the D-threshold device which applies the sgn-function to the left-most D bits in the vector z, f is the L-length pick-off vector given by $$f = [1 \; 0 \ldots 0]$$

g is the L-length initialization vector given by $$g = [0 \ldots 0 \; 1]$$

S is the L by L shift matrix given by $$S = \begin{bmatrix} 0 & 0 & & 0 & 0 \\ 1 & 0 & & 0 & 0 \\ 0 & 1 & & . & . \\ . & . & \cdots & . & . \\ . & . & & . & . \\ . & . & & 0 & 0 \\ 0 & 0 & & 1 & 0 \end{bmatrix}$$

$q_x$ is the L-length channel estimate vector assigned by the channel estimator 90.

2. A receiver system according to claim 1, wherein said channel estimator 90 has as inputs the received signal $r_k$ 60 and a training vector $q_k^T$ 330 whose coefficients are the past L known training bits $x_k$ 10, and the past M related output estimates $r_k$ 60 and as output the channel filter estimate $\tilde{c}_k$ 95 according to the recursive relation:

$$U_k = \gamma^{-1} P_{k-1}$$

$$v_k = U_k q_k$$

$$k_k = \frac{v_k}{1 + q_k^T v_k}$$

$$\eta_k = r_k - q_k^T \tilde{c}_{k-1}$$

$$P_k = U_k - k_k v_k^T$$

$$\tilde{c}_k = \tilde{c}_{k-1} + k_k \eta_k$$

where $\gamma$ is the desired exponential weighting parameter for the channel estimator, $P_{k-1}$ is the L by L inverse correlation matrix initialized to $\epsilon^{-1} I$, $\epsilon$ is the desired initialization parameter for the channel estimator, $\tilde{c}_k$ is the current estimate of the channel filter coefficients which is initialized at start-up to an arbitrary vector.

3. A receiver system according to claim 1 wherein the means for providing a channel estimate and sequence estimate which exploit the same software/hardware to perform the co functions defined by the recursive relation $$U_k = \gamma^{-1} P_{k-1}$$

$$v_k = U_k q_k$$

$$k_k = \frac{v_k}{1 + q_k^T v_k}$$

$$\eta_k = r_k - q_k^T \tilde{c}_{k-1}$$

$$P_k = U_k - k_k v_k^T$$

$$\tilde{c}_k = \tilde{c}_{k-1} + k_k \eta_k.$$

4. A receiver system as claimed in claim 1, wherein the means for providing a channel estimate is obtained off-line from empirical channel measurements and/or channel models.

5. A receiver system as claimed in claim 1, wherein sequence estimating or channel estimating functions are optimized for a particular computer architecture and/or compiler and/or channel while providing the recursive relation expressed by claim 1.

6. A receiver system as claimed in claim 1, wherein sequence estimating or channel estimating functions are optimized for a particular computer architecture and/or compiler and/or channel while providing the recursive relation expressed by claim 2.

7. A receiver system as claimed in claim 1 wherein the channel estimator or sequence estimator are implemented in whole or in pad by a combination of hardware, firmware and/or software.

8. A receiver system as claimed in claim 1, wherein the receiver system is reduced in complexity due to known channel conditions or assumptions, selected from a group consisting of a knowledge/assumption of white noise; and/or a knowledge/assumption of time-invariant channel filter; and/or a knowledge/assumption of stationary noise statistics; and/or a knowledge-/assumption of channel or noise models.

9. A receiver system as claimed in claim 8, wherein the receiver system is applied to stationary channels, where the gain vector $k_k$ of claim 1 is known to converge, and hence only the following relations of claim 1 are necessary after the gain vector $k_k$ converges to a steady-state value:

$$\eta_k = r_k - q_k^T \tilde{c}_{k-1}$$

$$\tilde{c}_k = \tilde{c}_{k-1}{}^D + k_k \eta_k$$

$$\hat{x}_{k-(L-1)} = sgn(f\tilde{c}_k)$$

$$\tilde{c}_{k-1}{}^S = e_{,otl}\, \tilde{c}_{k-1}{}^T S + \tilde{x}_k g$$

$$\tilde{c}_{k-1}{}^D = sgn_D(\tilde{c}_{k-1}{}^S).$$

10. A receiver system according to claim 1, wherein the sequence estimator is modified to provide sequence estimates of non-binary data.

11. A receiver system as claimed in claim 2, wherein the sequence and channel estimators provide sequence estimates over complex channels.

12. A receiver system as claimed in claim 2, wherein the sequence estimator or channel estimator use variants of recursive least squares algorithms.

13. A receiver system as claimed in claim 12, wherein the recursive least squares algorithms include: fast RLS algorithms, lattice implementations, and square-root or Cholesky factorization methods.

14. A receiver system as claimed in claim 1, wherein the channel estimator is implemented in batch form by the relation $$\tilde{c}_k = [Q_k^T W_k Q_k]^{-1} Q_k^T W_k r_k$$

where the observable vector $r_k$ 230 represents the L-length vector with the past L received signals $r_k$ 60, the training matrix Q is the L by L matrix whose rows are the past L training vectors $q_k^T$ whose contents are given by the past L known training bits, $W_k$ is an arbitrary weighting matrix, and $r_k$ is the observable vector which is updated with each new bit by the relation $$r_k^T = r_{k-1}^T S + r_k g.$$

15. A receiver system as claimed in claim 1, wherein the sequence estimator is implemented in batch form by the relation $$\tilde{c}_k = [Q_k^T W_k Q_k]^{-1} Q_k^T W_k r_k$$

$$\tilde{x}_{k-(L-1)} = f\tilde{c}_k$$

where the observable vector $r_k$ 230 represents the L-length vector with the past L received signals $r_k$ 60, the training matrix Q is the L by L matrix whose rows are the past L training vectors $q_k^T$ whose contents are given by the channel estimator, $W_k$ is an arbitrary weighting matrix, and $r_k$ is the observable vector which is updated with each new bit by the relation $$r_k^T = r_{k-1}^T S + r_k g.$$

16. A receiver system as claimed in claim 14, wherein the channel and sequence estimator exploit the same software procedure or the same hardware module to perform the core function given by the relation $$\tilde{c}_k = [Q_k^T W_k Q_k]^{-1} Q_k^T W_k r_k.$$

17. A receiver system as claimed in claim 15, wherein the channel and sequence estimator exploit the same software procedure or the same hardware module to perform the core function given by the relation $$\tilde{c}_k = [Q_k^T W_k Q_k]^{-1} Q_k^T W_k r_k.$$

18. A receiver system as claimed in claim 1, wherein a RLSSE algorithm is used for sequence estimation of transmitted data which has been coded by a scheme such as, but not limited to linear filtering, convolutional codes, and trellis-coded modulation techniques.

19. A receiver system as claimed in claim 1, wherein the operators S, f, and g are implemented in software/hardware as memory shift operations.

20. A receiver system as claimed in claim 1, wherein the means for providing a channel estimate is a channel estimator 90 which uses past decisions instead of a known training signal in order to update the channel estimate.

21. A receiver system for estimating an information sequence from a signal received on a channel, said signal comprising said information sequence with a partially unknown channel filter effect, said system comprising:

an estimator coupled to receive said signal; and
means for selectively inputting to said estimator in addition to said signal,
during a plurality of time intervals, parameters of said estimated information sequence to estimate said channel filter effect, and
during another, different plurality of time intervals, parameters of said estimated channel filter effect to estimate said information sequence; and wherein
same physical hardware, firmware and/or software of said estimator receives and estimates both said channel filter effect and said information sequence and said estimator uses same error criterion to estimate both said channel filter effect and said information sequence.

22. A system as set forth in claim 21 wherein said estimated information sequence parameters comprise a time average weighting factor and an initialization coefficient for a correlation matrix, and said channel filter effect parameters also comprise a time average weighting factor and an initialization coefficient for a correlation matrix.

23. A system as set forth in claim 21 wherein said error criterion is based on least squares.

24. A system as set forth in claim 21 wherein said error criterion is based on recursive least squares.

25. A system as set forth in claim 21 wherein said estimator estimates, for said channel filter effect, coefficients of a descrete-time equivalent channel filter.

26. A method for estimating an information sequence from a signal received on a channel, said signal comprising said information sequence with a partially unknown channel filter effect, said method comprising the steps of:

selectively inputting to an estimator, during a plurality of time intervals, said signal and parameters of said estimated information sequence to estimate said channel filter effect;
selectively inputting to said estimator during another, different plurality of time intervals, said signal and parameters of said estimated channel filter effect to estimate said information sequence; and
wherein same physical hardware, firmware and/or software of said estimator receives and estimates both said channel filter effect and said information sequence and said estimator uses same error criterion to estimate both said channel filter effect and said information sequence.

27. A method as set forth in claim 26 wherein said estimated information sequence parameters comprise a time average weighting factor and an initialization coefficient for a correlation matrix, and said channel filter effect parameters also comprise a time average weighting factor and an initialization coefficient for a correlation matrix.

28. A method as set forth in claim 26 wherein said error criterion is based on least squares.

29. A method as set forth in claim 26 wherein said error criterion is based on recursive least squares.

30. A method as set forth in claim 26 wherein said estimator estimates, for said channel filter effect, coefficients of a descrete-time equivalent channel filter.

31. A receiver system for estimating an information sequence from a signal received on a channel, said signal comprising said information sequence with a partially unknown channel filter effect, said system comprising:

an estimator coupled to receive said signal; and
means for selectively inputting to said estimator in addition to said signal,
during a plurality of time intervals, parameters of said estimated information sequence to estimate said channel filter effect, and
during another, different plurality of time intervals, parameters of said estimated channel filter effect to estimate said information sequence; and wherein
same physical hardware, firmware and/or software of said estimator receives and estimates both said channel filter effect and said information sequence, said estimator uses same error criterion to estimate both said channel filter effect and said information sequence, and said estimator, when estimating said information sequence, is based on the following:

$$U_k = \gamma^{-1} P_{k-1}$$

$$v_k = U_k q_k$$

$$k_k = \frac{v_k}{1 + q_k^T v_k}$$

$$\eta_k = r_k - q_k^T \tilde{c}_{k-1}$$

$$P_k = U_k - k_k v_k^T$$

$$\tilde{c}_k = c_{k-1} + k_k \eta_k$$

where $\gamma$ is a desired exponential weighting parameter for the sequence, $P_{k-1}$ is an L by L inverse correlation matrix initialized to $\epsilon^{-1}I$, I is an L by L identity matrix, $\epsilon$ is a desired initialization parameter for the estimator for the information sequence, $c_k$ is a soft-estimate vector of the information sequence initialized to an arbitrary vector, and $q_k^T$ is a training vector whose coefficients are past L known training bits $x_k$.

32. A receiver system for estimating an information sequence from a signal received on a channel, said signal comprising said information sequence with a partially unknown channel filter effect, said system comprising:

an estimator coupled to receive said signal; and means for selectively inputting to said estimator in addition to said signal, during a plurality of time intervals, parameters of said estimated information sequence to estimate said channel filter effect, and during another, different plurality of time intervals, parameters of said estimated channel filter effect to estimate said information sequence; and wherein same physical hardware, firmware and/or software of said estimator receives and estimates both said channel filter effect and said information sequence, said estimator uses same error criterion to estimate both said channel filter effect and said information sequence, and said estimator, when estimating said information sequence, is based on the following:

$$\tilde{c}_k = [Q_k^T W_k Q_k]^{-1} Q_k^T W_k r_k,$$

where a received signal vector $r_k$ represents a L-length vector with a past L received signals $r_k$, a training matrix Q is an L by L matrix whose rows are past L training vectors $q_k^T$ whose contents are given by the estimator for the channel filter effect, $W_k$ is an arbitrary weighing matrix, and $r_k$ is updated with each new bit by a relation $r_k^T = r_{k-1}^T S + r_k g$.

* * * * *